United States Patent
Barry

(10) Patent No.: US 7,254,695 B2
(45) Date of Patent: Aug. 7, 2007

(54) COPROCESSOR PROCESSING INSTRUCTIONS IN TURN FROM MULTIPLE INSTRUCTION PORTS COUPLED TO RESPECTIVE PROCESSORS

(75) Inventor: Edwin Franklin Barry, Vilas, NC (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 11/325,736

(22) Filed: Jan. 5, 2006

(65) Prior Publication Data

US 2006/0117166 A1    Jun. 1, 2006

Related U.S. Application Data

(62) Division of application No. 11/040,358, filed on Jan. 21, 2005, now Pat. No. 7,017,029, which is a division of application No. 09/792,819, filed on Feb. 23, 2001, now Pat. No. 6,865,663.

(60) Provisional application No. 60/184,560, filed on Feb. 24, 2000.

(51) Int. Cl.
    *G06F 15/16* (2006.01)

(52) U.S. Cl. .................................. 712/34; 712/28
(58) Field of Classification Search ............... None
    See application file for complete search history.

(56) References Cited

U.S. PATENT DOCUMENTS

| 5,960,209 | A | * | 9/1999 | Blount et al. .................. 712/1 |
| 6,829,697 | B1 | * | 12/2004 | Davis et al. .................. 712/21 |
| 2003/0148793 | A1 | * | 8/2003 | Sundararajan et al. ...... 455/561 |
| 2006/0029038 | A1 | * | 2/2006 | Jungck ...................... 370/351 |

* cited by examiner

Primary Examiner—Kenneth S. Kim
(74) Attorney, Agent, or Firm—Priest & Goldstein, PLLC

(57) ABSTRACT

A coprocessor instruction interface is described which provides a flexible degree of coupling with a host control processor. Specific methods are defined for architectures to make use of multiple coprocessing instruction interfaces with a single coprocessor for supporting client-server coprocessors (CSCOPs). A dynamic debug interface is used in each coprocessor instruction interface to support tightly coupled, loosely coupled and firmly coupled operation of the single conprocessor for a corresponding coupled control processor.

19 Claims, 9 Drawing Sheets

FIG. 4

MCB ADDRESS: 0x00700084  SPR ADDRESS: 0X0084  RESET VALUE: UNDEFINED
INSTRUCTION ADDRESS: 0X0000004

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | DEBUG INSTRUCTION REGISTER | | | | | | | | | | | | | | | | |

MCB ADDRESS: 0X0070080  SPR ADDRESS: 0X0080  RESET VALUE: 0x00000000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | | RESERVED | | | | | | | | | | | | DBSTALL | DBIP | DBDOBF | DBDIBF |

MCB ADDRESS: 0x00700040   SPR ADDRESS: 0X0040   RESET VALUE: 0x00000083

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| RESERVED | | | | | | | | | | | | | | | | | | | | | | | | | | Rsvd | DBIREn | Rsvd | LockPC | Rsvd | ResetDSP |

MCB ADDRESS: 0x0070008C   SPR ADDRESS: 0X008C   RESET VALUE: UNDEFINED

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| DEBUG DATA OUT | | | | | | | | | | | | | | | | | | | | | | | | | | | | | | | |

700

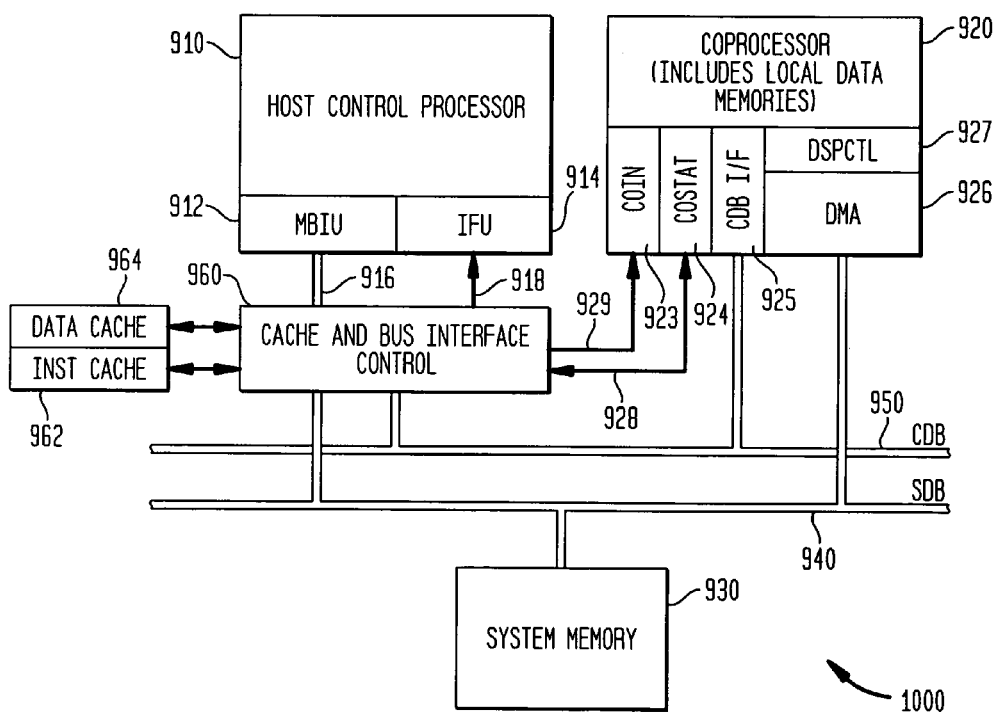

COPROCESSOR PROCESSING INSTRUCTIONS IN TURN FROM MULTIPLE INSTRUCTION PORTS COUPLED TO RESPECTIVE PROCESSORS

The present application is a divisional of U.S. application Ser. No. 11/040,358 filed Jan. 21, 2005, now U.S. Pat. No. 7,017,029 which is a divisional of U.S. application Ser. No. 09/792,819 filed Feb. 23, 2001, now U.S. Pat. No. 6,865,663 which claims the benefit of U.S. Provisional Application Ser. No. 60/184,560 filed Feb. 24, 2000, which are incorporated by reference herein in their entirety.

FIELD OF THE INVENTION

The present invention relates generally to improvements in coprocessing interfaces and more particularly to advantageous techniques for providing a flexible degree of coupling between a host processor and a digital signal processor.

BACKGROUND OF THE INVENTION

A multiprocessor system consists for two or more processors that communicate to accomplish some task. The processors in the multiprocessor system may or may not be the same. The communications delay between the processors can be considered as representing the coupling strength between the processors. The communications delay represents the time required for a host or control processor to dispatch an operation or command to a coprocessor and for that coprocessor to initiate a response to it. A loosely coupled multiprocessor system usually has a relatively long communications delay as compared to a tightly coupled multiprocessor system that typically has a relatively short communications delay.

There is a class of processors that is described as coprocessors that may not be able to fetch their own instructions but use a "host" processor to supply application specific instructions to the coprocessor. The purpose of the coprocessor is to provide better performance for specialized tasks than could be obtained by the "host" processor acting alone. There is also a class of processors with specialized capabilities, such as digital signal processors (DSPs), that may act as a coprocessor to a control processor. For a number of complex applications, an efficient control processor and an efficient DSP are coupled together to provide an efficient overall solution. It will be recognized that an efficient coupling mechanism is necessary to make a control processor and a DSP system an effective system.

SUMMARY OF THE INVENTION

The ManArray scalable family of core processors provides a dual use mechanism for debug support and for a general coprocessor interface. The features of the debug interface can be envisioned to be equally applicable to a coprocessor interface. For an exemplary ManArray processor, the following features of debug support are provided: processor reset control, instruction fetch control, external or internal (monitor) based debug control, read/write registers, read/write instruction/data memory, read/write VLIW memory (VIM), single-step operation, instruction address breakpoint events, and data address breakpoint events.

There are two standard approaches to achieving a high level of observability and controllability of hardware for debug purposes. One involves the use of scan chains and clock-stepping along with a suitable hardware interface, such as defined by the Joint Task Action Group (JTAG) standard, to a debug control module which supports basic debug commands. This approach allows access on a cycle-by-cycle basis to any resources included in the scan chains, usually registers and memory. It relies on the process technology to support the scan chain insertion and may change with each implementation. The second approach uses a resident debug monitor program which may be linked with an application or resides in on-chip ROM. Debug interrupts may be triggered by internal or external events and the monitor program then interacts with an external debugger to provide access to internal resources using the instruction set of the processor.

The approach proposed here is similar to the debug monitor approach, but allows for debug without a debug monitor program being loaded with, or prior to, the application code. This approach provides a dynamic debug monitor, in which the debug monitor code is dynamically loaded into the processor and executed on any debug event which stops the processor, such as a breakpoint or "stop" command. The debug monitor code is unloaded when processing resumes. This approach includes the static debug monitor as a subset of its operation, but also provides some of the benefits of fully external debug control found in the scan-chain approach.

This dynamic debug interface may be used to provide a coprocessor interface which supports tightly coupled, loosely coupled and firmly coupled operation. One exemplary system for implementing the present invention contains at least two processors. One processor is a ManArray processor operating as the system's coprocessor and the other is a control type processor such as an ARM, MIPS, X86, PowerPC or the like. Tightly coupled operation in this system context means that the coprocessor receives all of its instructions from the control processor. Sometimes a tightly coupled coprocessor is called a "slave processor" since it does not have an independent means of fetching its instructions. Specifically, in this tightly coupled system, an instruction which is not part of the host control processor's instruction set, is dispatched to and accepted by the coprocessor and the control processor does not continue processing further instructions of its own until the coprocessor has completed execution of its instruction.

Loosely coupled operation in this system context means that the host processor dispatches a signal or message to the coprocessor, which then, by executing its own instruction sequence, interprets the message or responds to the signal. The coprocessor then may execute a further sequence of instructions, for example, a subroutine, depending on the message value or signal type. Both the interpretation of a message and subsequent instruction execution based on this interpretation by the coprocessor are carried out concurrently with the host processor's own instruction execution. When a coprocessor subroutine is completed, the coprocessor typically signals completion back to the control processor, and waits for the control processor to send another message to initiate another coprocessor subroutine. In loosely coupled processing, the coprocessor uses its own instruction fetch unit and instruction memory to execute programs.

Firmly coupled coprocessing in this system context specifies that the coprocessor can optionally fetch a sequence of instructions from an instruction first-in-first-out (FIFO) buffer that is allocated a portion of the instruction memory address space. The coprocessor has its own instruction address register, or program counter (PC), and may be directed by a host processor to execute a concurrent subroutine by placing a call or branch-type instruction into the coprocessor's instruction FIFO. When this subroutine is complete, the coprocessor branches to the address of the instruction FIFO. If more instructions are present, then they are executed, otherwise the coprocessor stalls and waits for further instructions. Use of the firmly coupled approach allows the same interface to be used for coprocessors which have a PC and those which do not. If no PC is present in the coprocessor, all the coprocessor instructions are fetched from the coprocessor FIFO.

This coprocessor interface can be designed to advantageously support tightly coupled processing through interlocking with the host processors instruction fetch/decode unit, loosely coupled coprocessing in a coprocessor with a PC, and firmly coupled coprocessing which provides the features of both loose and tight coupling in a common mechanism.

These and other aspects and advantages of the present invention will be apparent from the drawings and the Detailed Description which follow.

BRIEF DESCRIPTION OF THE DRAWINGS

FIG. 4 illustrates a debug instruction register (DBIR) in accordance with the present invention;

FIG. 5 illustrates a debug status register (DBSTAT) in accordance with the present invention;

FIG. 6 illustrates a DSP control register (DSPCTL) in accordance with the present invention;

FIG. 7 illustrates a debug data out register (DBDOUT) in accordance with the present invention;

FIG. 8 illustrates a debug data in register (DBDIN) in accordance with the present invention;

FIG. 9 illustrates a tightly-coupled coprocessing system in accordance with the present invention;

DETAILED DESCRIPTION

Figure 1:
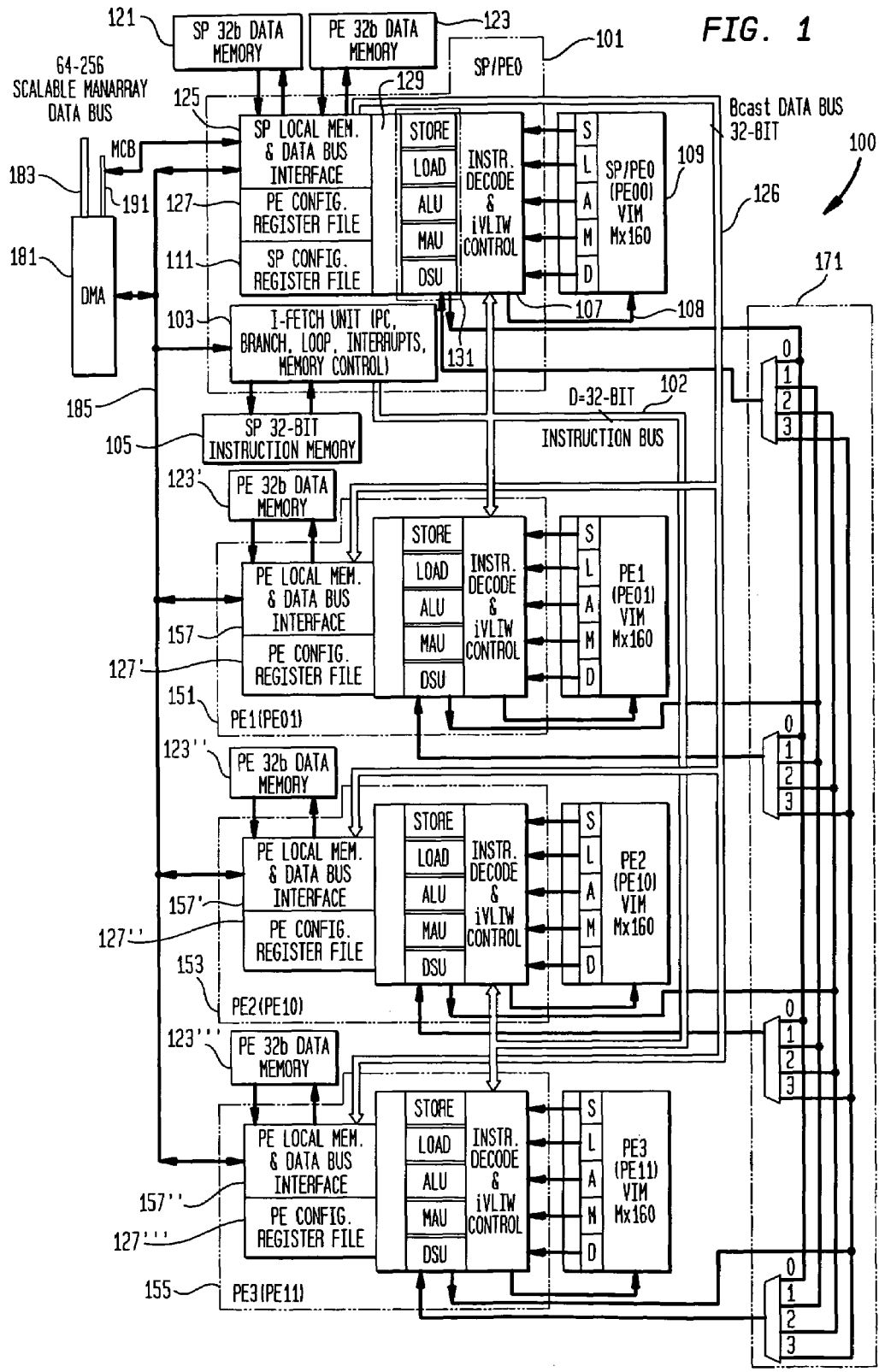
FIG. 1 illustrates an exemplary ManArray DSP and DMA subsystem appropriate for use with this invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, now U.S. Pat. No. 6,343,356, U.S. patent application Ser. No. 09/169,256 filed Oct. 9, 1998, now U.S. Pat. No. 6,167,501, U.S. patent application Ser. No. 09/169,072, filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,588 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999 now U.S. Pat. No. 6,216,223, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/350,191 filed Jul. 9, 1999, now U.S. Pat. No. 6,356,994, U.S. patent application Ser. No. 09/422,015 filed Oct. 21, 1999, now U.S. Pat. No. 6,408,382, U.S. patent application Ser. No. 09/432,705 filed Nov. 2, 1999, now U.S. Pat. No. 6,697,427, U.S. patent application Ser. No. 09/471,217 filed Dec. 23, 1999, now U.S. Pat. No. 6,260,082, U.S. patent application Ser. No. 09/472,372 filed Dec. 23, 1999, now U.S. Pat. No. 6,256,683, U.S. patent application Ser. No. 09/596,103, now U.S. Pat. No. 6,397,324, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled, filed Jun. 21, 2000, now U.S. Pat. No. 6,622,234, U.S. patent application Ser. No. 09/598,566, filed Jun. 21, 2000, now U.S. Pat. No. 6,735,690, U.S. patent application Ser. No. 09/598,084 entitled, filed Jun. 21, 2000, now U.S. Pat. No. 6,654,870, U.S. patent application Ser. No. 09/599,980, filed Jun. 22, 2000, now U.S. Pat. No. 6,748,517, U.S. patent application Ser. No. 09/791,256, filed Feb. 23, 2001, U.S. patent application Ser. No. 09/791,940, filed Feb. 23, 2001, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203,629 entitled "Methods and Apparatus for Power Control in a Scalable Array of Processor Elements" filed May 12, 2000, and Provisional Application Ser. No. 60/241,940 entitled "Methods and Apparatus for Efficient Vocoder Implementations" filed Oct. 20, 2000, and Provisional Application Ser. No. 60/251,072 entitled "Methods and Apparatus for Providing Improved Physical Designs and Routing with Reduced Capacitive Power Dissipation" filed Dec. 4, 2000, all of which are assigned to the assignee of the present invention and incorporated by reference herein in their entirety.

A coprocessor interface in accordance with the present invention is obtained by generalizing the debug mechanism and using it to function as a general coprocessor interface. The basic debug mechanism is described first in the context of an exemplary ManArray processor system, and then it is extended to function as a general coprocessor interface for other contexts utilizing other processors.

In a presently preferred embodiment of the present invention, a ManArray 2×2 iVLIW single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 are also labeled with their matrix positions as shown in parentheses for PE0 (PE00) 101, PE1 (PE01)151, PE2 (PE10) 153, and PE3 (PE11) 155. The SP/PE0 101 contains an instruction fetch (I-fetch) controller 103 to allow the fetching of "short" instruction words (SIW) or abbreviated-instruction words from a B-bit instruction memory 105, where B is determined by the application instruction-abbreviation process to be a reduced number of bits representing ManArray native instructions and/or to contain two or more abbreviated instructions as described in the present invention. If an instruction abbreviation apparatus is not used then B is determined by the SIW format. The fetch controller 103 provides the typical functions needed in a programmable processor, such as a program counter (PC), a branch capability, eventpoint loop operations (see U.S. Provisional Application Ser. No. 60/140,245 entitled "Methods and Apparatus for Generalized Event Detection and Action Specification in a Processor" filed Jun. 21, 1999 for further details), and support for interrupts. It also provides the instruction memory control which could include an instruction cache if needed by an application. In addition, the I-fetch controller 103 controls the dispatch of instruction words and instruction control information to the other PEs in the system by means of a D-bit instruction bus 102. D is determined by the implementation, which for the exemplary ManArray coprocessor D=32-bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function; for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW instruction memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), ALU (A), MAU (M), and DSU (D).

The basic concept of loading the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Method and Apparatus for Dynamic Instruction Controlled Reconfiguration Register File with Extended Precision". Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. patent application Ser. No. 08/885,310 entitled "Manifold Array Processor", now U.S. Pat. No. 6,023,753, and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1.

Debug Operation

Figure 2:
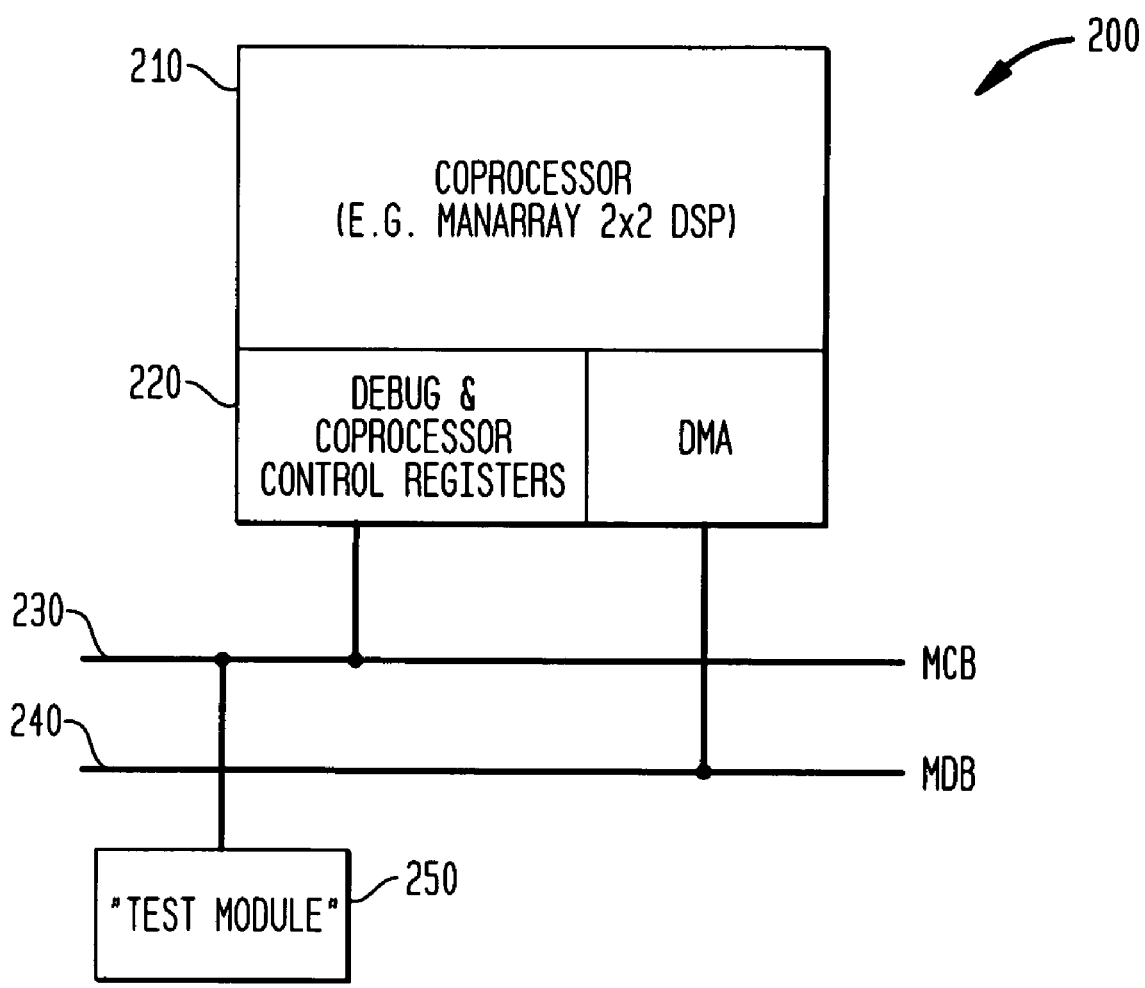
FIG. 2 illustrates a representative coprocessor together with a debug test module in accordance with the present invention.

FIG. 2 shows an exemplary system 200. In system 200, a coprocessor 210 which may suitably be a ManArray DSP 2×2 (2×2) has debug and control registers 220 which may be accessed both by coprocessor instructions and by bus masters residing on ManArray control bus (MCB) 230. In this exemplary system, the coprocessor instructions used are the load from special-purpose register (LSRP) and store to special-purpose register (SSPR) instructions. These instructions may be used to access all of the debug and control registers 220 which are visible to MCB master devices. A ManArray data bus (MDB) 240 is also shown, connecting coprocessor local memories within the boundary of 210 via a DMA controller to other memory or input/output (I/O) devices residing on the MDB. A "test module" 250 is shown which acts as a bus master on the MCB and which is capable of initiating read and write cycles to the coprocessor control and debug registers 220. The test module 250 has read/write access to the coprocessor's instruction memory. This test module may represent a host control processor, or other interface logic which allows a standard debug path, such as JTAG, to connect to the MCB 230 and issue read and write cycles. There is also provided a mechanism by which the test module may initiate a debug interrupt signal to the coprocessor either by writing to a particular MCB address or by configuring certain registers to assert the debug interrupt signal when the coprocessor reaches a specified program state, either an instruction or data address, for example. This latter mechanism is preferably programmed utilizing a set of event point registers described in U.S. patent application Ser. No. 09/598,566 and U.S. Provisional Application Ser. No. 60/140,245 both entitled "Methods and Apparatus for Generalized Event Detection and Action Specification in a Processor" and filed Jun. 21, 2000 and Jun. 21, 1999, respectively, both of which are incorporated by reference herein in their entirety.

Debug interface and usage are described below:

The test module 250 of FIG. 2 initiates a debug interrupt signal to the coprocessor. This may be done as described above, either by writing to a particular MCB address or by configuring an event point register to trigger the debug interrupt when a coprocessor program state instruction address or data address, for example, is reached.

Figure 3:
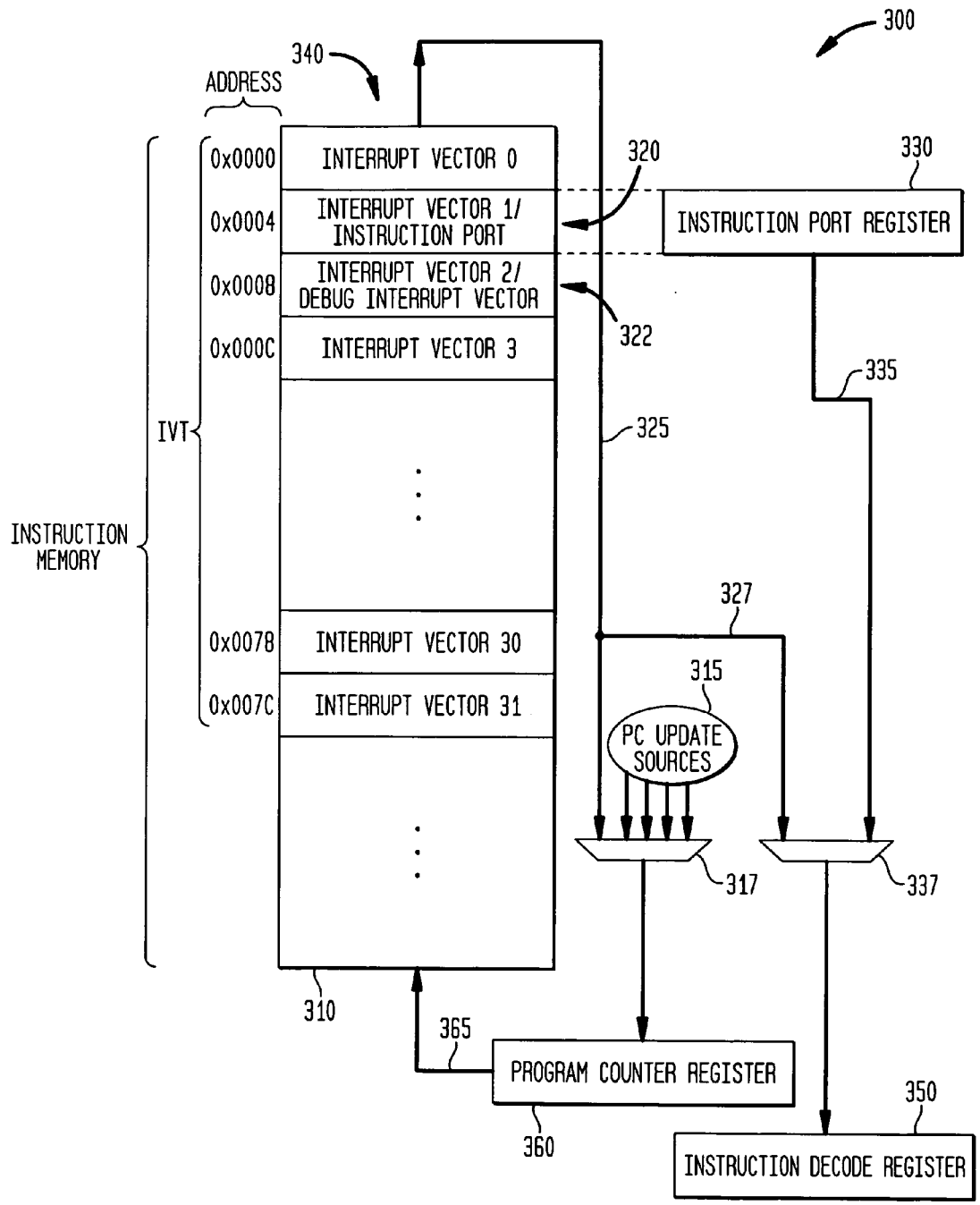
FIG. 3 illustrates a coprocessor and debug port interface for sharing the ManArray instruction decode register between two possible sources of instructions in accordance with the present invention.

The coprocessor responds to the debug interrupt by saving the current program state (all essential registers) and fetching an instruction memory address (called an "interrupt vector") from a region of instruction memory 310 seen in FIG. 3 called the interrupt vector table (IVT) 340. The debug interrupt vector 320 in an exemplary system is shown located at instruction memory address 0x0008, 322. The value stored at 0x0008 is loaded via the instruction bus 325 through a multiplexer 317 to the program counter register (PC) 360. The PC then supplies the next address from which to fetch an instruction via the instruction address bus 365.

If the address stored in the debug interrupt vector location 322 is that of an instruction outside of the IVT, then the instruction at this address is fetched via instruction bus path 327 through the multiplexer 337 to the instruction decode register (IDR) 350. It is subsequently decoded and executed and further instructions are processed starting from that address. In this fashion, a debug interrupt service routine may be located somewhere in the instruction memory, and this may be used to enter a debug monitor program and thereby interact with the test module. This is one form of debug initiation for which the present invention is suitable. A second form of debug initiation is also provided in the following event.

If the address stored in the debug interrupt vector is a particular value, 0x0004 in the exemplary system, then the interrupt processing logic operates in a unique fashion. This address, stored in memory location at 320 of FIG. 3, may be configured to cause the interrupt logic to fetch its next instruction from a debug instruction register (DBIR) rather than from the instruction memory address 0x0004. FIG. 4 shows an exemplary DBIR 400. This register 400 is visible to bus masters on the MCB, and in particular to the test module 250 of FIG. 2. A second register called the debug status register (DBSTAT) 500 shown in FIG. 5, controls the behavior of the coprocessor when it fetches from the DBIR in response to a fetch from address 0x0004. A bit in DBSTAT register 530, called the "debug instruction present" (DBIP) bit is used to indicate whether or not an instruction may be fetched.

If the DBIP bit of DBSTAT is zero, then when the coprocessor attempts to fetch an instruction from address 0x0004 in the DBIR register, it stalls, preventing updates to any processor state. If the test module then writes an instruction to the DBIR, the DBIP bit of DBSTAT is set to 1. This causes the coprocessor to fetch this instruction from the DBIR, and the DBIP bit is cleared, thereby causing the coprocessor to stall until the next instruction is written to the DBIR. In this manner, the test module may gain control of the coprocessor by feeding it instructions one at a time. Whenever the DSP is stalled waiting for an instruction to be placed into the DBIR, the debug stall bit (DBSTALL) 520 is set to 1 in the DBSTAT register. This bit may be used by the test module or other control processor having MCB access to indicate when the coprocessor is in a stalled state waiting for a debug instruction.

Two additional control bits are provided in a DSP control register (DSPCTL) shown in FIG. 6 600. The debug instruction register enable bit (DBIREN) 620, when set, causes any instruction fetch from address 0x0004 to be redirected to fetch from the DBIR as described above. If this bit is cleared to zero, then a fetch from 0x0004 behaves as if it were any other instruction and the contents of this address are sent to the IDR 350, of FIG. 3 for decode and subsequent execution. This allows the IVT address to be optionally used for a normal interrupt vector. The LOCKPC bit of the DSPCTL register is used to prevent the PC from incrementing or updating at all after fetching and executing instructions. Since the DSPCTL register is accessible by MCB masters, this bit is also accessible by the test module. In normal operation, the automatic incrementing of the PC after instruction fetch is inhibited while fetching instructions from the DBIR. If a branch instruction is executed, then the branch address is loaded into the PC and subsequent instructions are fetched with automatic PC incrementing re-enabled. When the LOCKPC bit is set, even branch type instructions will not affect the PC value. This allows program sequences to be executed through the DBIR port in such a manner as to filter out branches.

An alternative approach for controlling PC auto-incrementing is through the use of a second MCB address for MCB writes to the DBIR. When the first address is used for writing instructions to the DBIR, the PC only updates when a branch instruction is executed. When the second address is used, the PC is locked or prevented from updating for all instructions written and branches are ignored.

By using the debug mechanisms outlined above, a debug interrupt can be made to cause the coprocessor to stall, waiting for instructions to be sent to it through the DBIR. When this occurs, the test module may issue instructions through the DBIR which, by executing, dump the processor state out to an external memory or the test module itself for external storage. Two additional registers are provided which allow coprocessor state to be saved without corrupting it. A debug data-out register (DBDOUT) 700 seen in FIG. 7 and a debug data-in register (DBDIN) 800 seen in FIG. 8 are used for this purpose. When the coprocessor writes to the DBDOUT register, a bit in the DBSTAT register 540 seen in FIG. 5 is set. This bit called the debug data output buffer full (DBDOBF) bit indicates that the DBDOUT register contains data written by the coprocessor. A read of the DBDOUT register by the test module will cause this bit to be automatically cleared. To allow the coprocessor to read data from the test module (used typically for restoring state, or debugger communication), the DBDIN register is used. An MCB write to the DBDIN register causes the debug data input buffer full (DBDIBF) bit 550 of FIG. 5 to be set in the DBSTAT register, indicating that there is data available. This bit is cleared when the coprocessor performs a read of the DBDIN register. For each of the two data registers, DBDOUT and DBDIN, secondary addresses (MCB and LSPR/SSPR) for data reads are provided which allow the register to be read without clearing the DBDOBF or DBDIBF bits.

Once the coprocessor stalls waiting for an instruction, it is possible for the test module to access the coprocessor's instruction memory. A region of this memory may then be copied (read and stored) to an external data store and replaced with a debug monitor program. By writing a branch instruction (e.g. JMPD) to the DBIR, the test module can then direct execution to the "inserted" debug monitor. This monitor code may be used to dump selected state information, such as register and memory contents, to the DBDOUT register for reading by the test module. When the debug function is complete, the last instruction causes a branch to the DBIR address (0x0004). The coprocessor then stalls waiting for the next instruction and the application's instructions are restored to the instruction memory by the test module. When the last debug module has been executed, a "return-from-interrupt" (RETI) instruction is written to the DBIR by the test module. The coprocessor fetches this instruction causing the application to return to its pre-interrupt state and resume execution. During execution of the debug monitor code, the DBDIN register can be used by the test module to pass data or commands to the "inserted" monitor code.

To single-step the processor, the debug interrupt request bit in the interrupt request register (IRR) may be set explicitly by a coprocessor instruction. When the RETI is executed, the coprocessor will return to executing the application code for one instruction before taking the pending debug interrupt. This allows one instruction to be fetched and executed at a time.

Coprocessor Operation

With this understanding of the debug event sequence and debug registers, it is next explained how the debug interface may be generalized to provide a coprocessor interface with varying levels of coupling.

The debug interface described herein may advantageously have the following general characteristics. A segment of instruction memory (the IVT 340 of FIG. 3 in this case) has at least two modes of access. The first mode is such that the data from an address is treated as a vector or branch target and placed into the PC 360, and occurs when responding to an interrupt. The second mode is when the data from an address is treated as an instruction to be placed in the IDR 350 for subsequent decode and execution.

One or more addresses within this special segment of memory have "shadow" instruction registers or memory buffers associated with them. That is, these addresses may access one physical memory location during one access mode (e.g. interrupt vector fetch) and the second "shadow" location for another access mode (e.g instruction fetch). For the case of debug, the IVT address 0x0004 320 is shadowed by the DBIR register 330 in the preceeding discussion. These shadow registers may alternatively be replaced by memory buffers which operate is first-in-first-out (FIFO) queues when an external device writes instructions to them and when the coprocessor fetches instructions from them.

There are control bits associated with each of the special addresses that are shadowed. One bit controls whether the shadow function (debug instruction execution via DBIR in the discussion above) is enabled or disabled, a second is used to indicate when an instruction is available to the coprocessor from the shadow instruction register or buffer (e.g. DBIP 530 in FIG. 5), and a third is used to indicate to an external device when the coprocessor is stalled waiting for an instruction (e.g. DBSTALL 520). An optional fourth bit may be used to control locking of the PC thereby disallowing branches to redirect program execution from the shadow instruction address.

Bus addresses are provided which allow an external bus master to write instructions to the shadow instruction registers. Each shadow instruction register has a pair of addresses. Writing instructions to the first address allows branch instructions to cause the PC to be updated (i.e. the branch to be executed), and writing instructions to the second address does not allow the PC to be updated for branch instructions. This is analogous to the LOCKPC bit of the DSPCTL register described above.

Interface registers are provided for inter-processor communication, along with associated control and status bits for indicating when they are read/written (DBDIN 800 of FIG. 8 and DBDOUT 700 of FIG. 7 along with the DBDOBF 540 of FIG. 5 and DBDIBF 550 bits of the DBSTAT register in the above discussion). In the exemplary system, these registers may be accessed using LSPR and SSPR instructions by the DSP coprocessor and by read/write accesses on the MCB by the test module or host control processor.

The characteristics listed above may be used to implement a more general coprocessor interface which may be used in tightly coupled, loosely coupled and firmly coupled coprocessing systems as well as for debug operations. A given implementation might advantageously allow the sharing of a single interface for both coprocessing and debug purposes such as that described in the preceeding section, or independent interfaces (separate shadowed instruction register or memory buffer addresses) for the coprocessing and debug functions. An implementation might also use multiple instances of the interface to allow multiple external processing devices to send instructions to the coprocessor. The following sections describe various types of applications consistent with the teachings of the present invention.

Tightly-Coupled Co-processing Systems

For a tightly coupled coprocessing system, the coprocessor does not have its own independent instruction fetch logic or PC. FIG. 9 shows a high-level view of a representative system 900. A host control processor (HCP) 910, a coprocessor 920 and a system memory 930 are shown connected by a system data bus (SDB) 940, a coprocessor data bus (CDB) 950, a coprocessor instruction bus 929 and coprocessor control signals 928. A memory bus interface unit (MBIU) 912 provides a data path for the HCP to read/write data from the data cache 964 or access the system data bus SDB or CDB 950. An instruction fetch unit (IFU) 914 controls HCP instruction fetch sequence and the cache and bus interface control unit (CBICU) manages instruction cache 962 accesses, cache line refills via the SDB 940 from system memory 930, and dispatches instructions to the coprocessor via the coprocessor instruction bus 929 and coprocessor control signals 928.

The coprocessor contains at least one coprocessor instruction register (COIN) 923, a coprocessor status and control register (COSTAT) 924, coprocessor data bus interface logic 925 that allows the coprocessor to access host registers via LSPR- or SSPR-type instructions and the HCB to access coprocessor registers, a coprocessor control register (DSPCTL) 927, a DMA controller 926, and local data memories. The DSPCTL register is used to control high level coprocessor functions such as RESET, and the LOCKPC function as described in the preceeding sections.

During operation, the HCP fetches instructions via the CBICU. Instructions are dispatched in parallel to the COIN register 923 via the coprocessor instruction bus 929 and also to the HCP via its instruction fetch bus 918. An alternate, and preferred approach is to separate coprocessor instructions from HCP instructions using different memory regions, and designing the CBICU 960 to issue instructions only to the coprocessor when executing in its memory region. The HCP in the exemplary embodiment must always be aware of branch instructions, therefore, unless this capability is provided in the CBICU, it is necessary to always issue instructions to the HCP, even if they are treated as no-operation (NOP) instructions. This arrangement has the advantage of saving power when the coprocessor is not in use. When an instruction is received at the COIN register, a bit in the COSTAT register, IPRES (analogous to the DBIP bit 530 of FIG. 5) is set to indicate an instruction is available. For tightly-coupled operation, a bit COREADY (directly analogous to the DBSTALL bit 520 of FIG. 5) is used to provide flow control to the HCP CBICU instruction dispatch logic. It is set whenever the coprocessor is able to receive an instruction in the COIN register and cleared otherwise. In order to allow instruction processing to proceed with minimum delay, for tightly-coupled systems, the COREADY bit may be generated with combinational logic based upon the IPRES bit and the state of the coprocessor pipeline so that the coprocessor can receive an instruction on each cycle. Coprocessor instructions fetched by the HCP are ignored by it, but they are processed immediately by the coprocessor via the coprocessing interface. The mechanism used may be shared with debug logic also. In this manner, the HCP controls the instruction sequence while the coprocessor executes instructions that are not native to the HCP architecture. HCP-Coprocessor register-to-register transfers are provided via the CDB. The coprocessor provides special instructions for this purpose (e.g. LSPR and SSPR) and the HCP either provides special instructions or maps certain parts of its data address space so that accesses to those regions are converted to data accesses to the coprocessor registers by means of the CDB.

Tightly-coupled processing is characterized by the fact that while the coprocessor is executing instructions, the HCP is not executing instructions other than branch-type instructions which are ignored by the coprocessor. Selected condition information from coprocessor execution is provided by means of the coprocessor control signals 928. The same hand-shake operation by means of the IPRES (DBIP) bit and the COREADY (DBSTALL) bit are carried.

Loosely-Coupled Coprocessing

Figure 10:
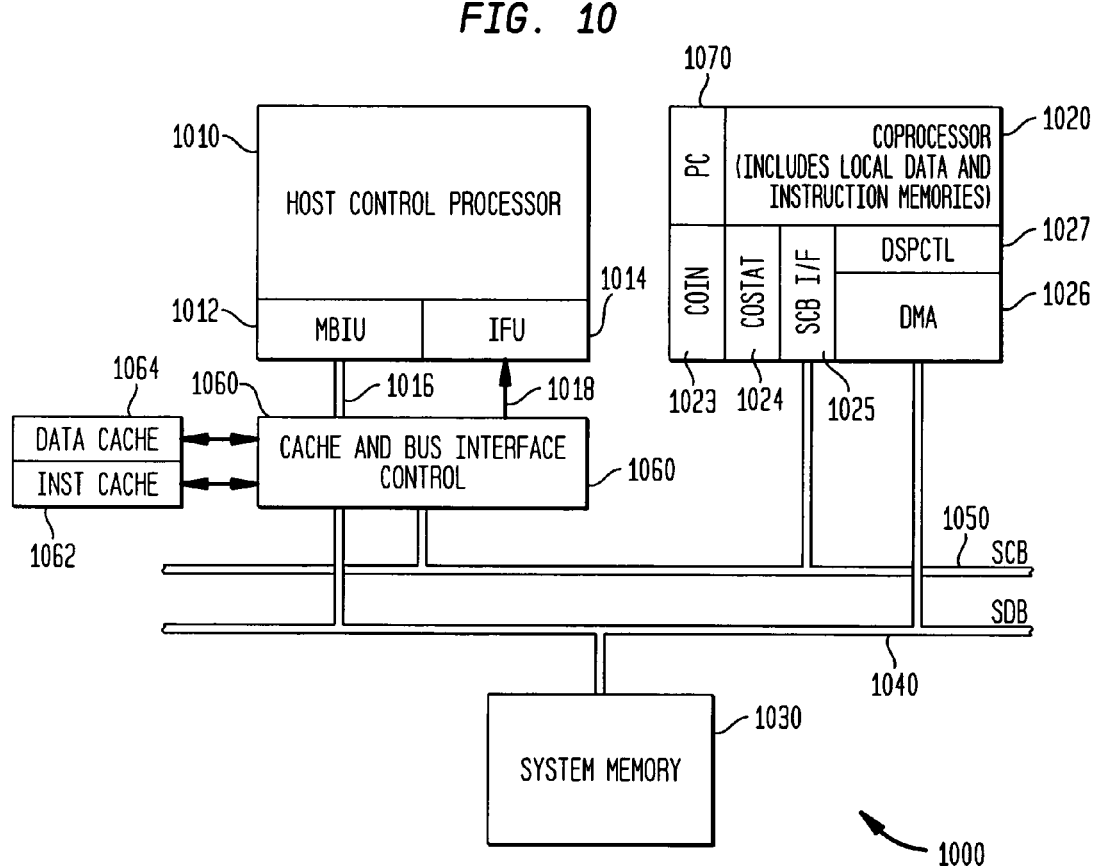
FIG. 10 illustrates a loosely-coupled coprocessing system in accordance with the present invention.

FIG. 10 shows a system 1000 very similar to system 900 of FIG. 9. In this representative system 1000, the the coprocessor is equipped with a program counter register (PC) 1070 and local instruction memory 1020. A further modification is that the CDB 950 of FIG. 9 has been changed to a more general system control bus 1050. This bus 1050 provides access to the same registers as with the tightly-coupled system but with longer latency and somewhat lower hardware cost, because it is not assumed that the HCP will supply instructions to the processor as frequently. While the system shown in FIG. 10 has an SCB 1050, depending on the performance requirements, the SDB 1040 might be the only bus required for the system, in which case all interprocessor communication occurs on a single bus.

It system 1000, the HCP initiates coprocessor execution at procedure or program granularity rather than at instruction granularity. DMA controller 1026 may be programmed to load data and instruction memories. The HCP can write an instruction to COIN 1023 via the SCB 1050. This instruction would typically be a direct branch (JMPD) or call (CALLD) instruction. In order to allow a subroutine to return to wait at the COIN register for the next function, the subroutine must branch back to the COIN register address, (such as 0x0004 for the debug case, though this address might be another address within the IVT for a coprocessor interface. Normally, a CALL type instruction returns to the address following the instruction itself. If the CALL type instruction is read from the COIN register, a return would cause the next instruction fetch to occur at the address following the address of the COIN register. This could be resolved by saving the address of the CALL instruction itself for those cases in which the instruction comes from the COIN register. In the exemplary system, the return address is saved in a register called the user-link register (ULR). This register is programmer visible and may be modified by load-type or copy instructions. The behavior of the coprocessor interface and signals is the same as for the debug or tightly-coupled cases, including the use of the IPRES and COREADY bits.

Loosely-coupled processing is characterized by having the coprocessor execute entire functions or programs before returning to look for further instructions from the host processor. Data may be communicated between the processors through registers similar to the DBDOUT and DBDIN registers of FIGS. 7 and 8, respectively.

Firmly-Coupled Coprocessing

Figure 11:
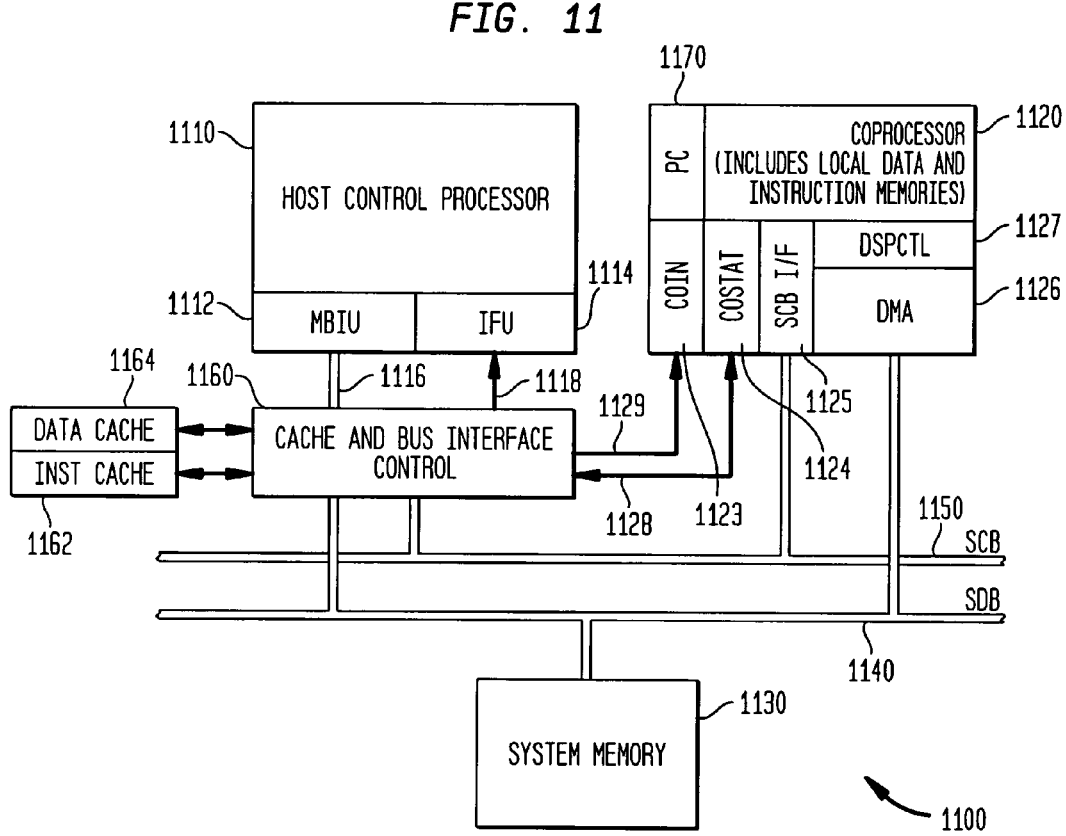
FIG. 11 illustrates a firmly-coupled coprocessing system in accordance with the present invention.

FIG. 11 shows a representative system 1100 which may be considered a "firmly-coupled" coprocessing system. Coprocessor 1120 in this implementation contains a PC 1170 just as with the loosely-coupled system 1000 of FIG. 10. It also has its own local instruction memory and the same coprocessor interface registers COIN 1123, COSTAT 1124, and DSPCTL 1127 as the other system described above. System 1100 also includes a coprocessor instruction bus 1129 and interface control signals 1128 that are used in tightly-coupled systems, but absent from loosely-coupled systems. One idea behind this class of system is that it has a limited level of autonomy. That is, while it has a PC, the instruction memory may be fairly small and processing may be focused on particular types of instruction sequences, for example, the processing of inner loops of functions. It also may receive instructions directly from the HCP 1114 by way of a cache and bus interface control unit (CBICU) 1160. The COIN register 1123 may also be extended to become a first-in-first-out (FIFO) queue for instructions. Providing a FIFO buffer for capturing instructions from the HCP allows the clock rates of the HCP and coprocessor to differ while maintaining a clean interface at the FIFO. If the HCP is capable of a higher clock rate, providing an instruction buffer allows it to dispatch multiple instructions to a coprocessor at full speed rather than being interlocked to the processor. The control interface for the FIFO retains the same IPRES and COREADY bits which in this case indicate "FIFO not empty" (coprocessor instructions available) and "FIFO not full" (room for more instructions from HCP).

In one exemplary system, such as a ManArray indirect-VLIW DSP, there are two classes of instruction memories. One contains "short" instructions, typically 32-bits in the current embodiment, and the other contains very-long-instruction words (VLIWs). The PC is used to access the short instruction memory. A certain type of (short) instruction, called an execute-VLIW (XV) instruction, may be used to indirectly reference a VLIW instruction from the VLIW instruction memory. When decoded, the XV instruction causes a VLIW to be accessed and executed. A VLIW consists of multiple instructions which are executed in parallel. Another type of "short" instruction is the "load-VLIW" (LV) instruction which is used to load the VLIW instruction memories. The LV instruction is followed by one or more instructions which are not executed immediately, but are rather placed into a VLIW instruction memory address specified by the LV instruction. A firmly coupled coprocessing system utilizing a ManArray DSP might then provide a small short instruction memory used for loading and executing VLIWs and a coprocessor interface through which the HCP writes branch instructions to the COIN register to initiate VLIW instruction processing.

The ManArray DMA controller of the exemplary system also has characteristics that allow it to combine with the coprocessor to allow a greater level of autonomy without large instruction memory cost and low overhead on the HCP. The DMA controller is able to fetch its own instructions from the coprocessor local memory. Based on these instructions, it can then load the coprocessor instruction memory, data memories, and then send a message to the COIN register which is a branch instruction to the program code entry point. Alternatively, completion of the DMA transfers may be configured to signal the HCP that the coprocessor program is ready for execution, and the HCP can issue a branch instruction to the COIN register. If additional DMA instructions are included in the transfers associated with the first task, the DMA instruction fetch logic is able to branch to the next set of DMA instructions and so load the next task while the first task is executing on the coprocessor. HCP involvement in this process is then reduced to managing groups of DMA instructions, each of which causes the execution of a coprocessor task or function.

Client-Server Coprocessing

Figure 12:
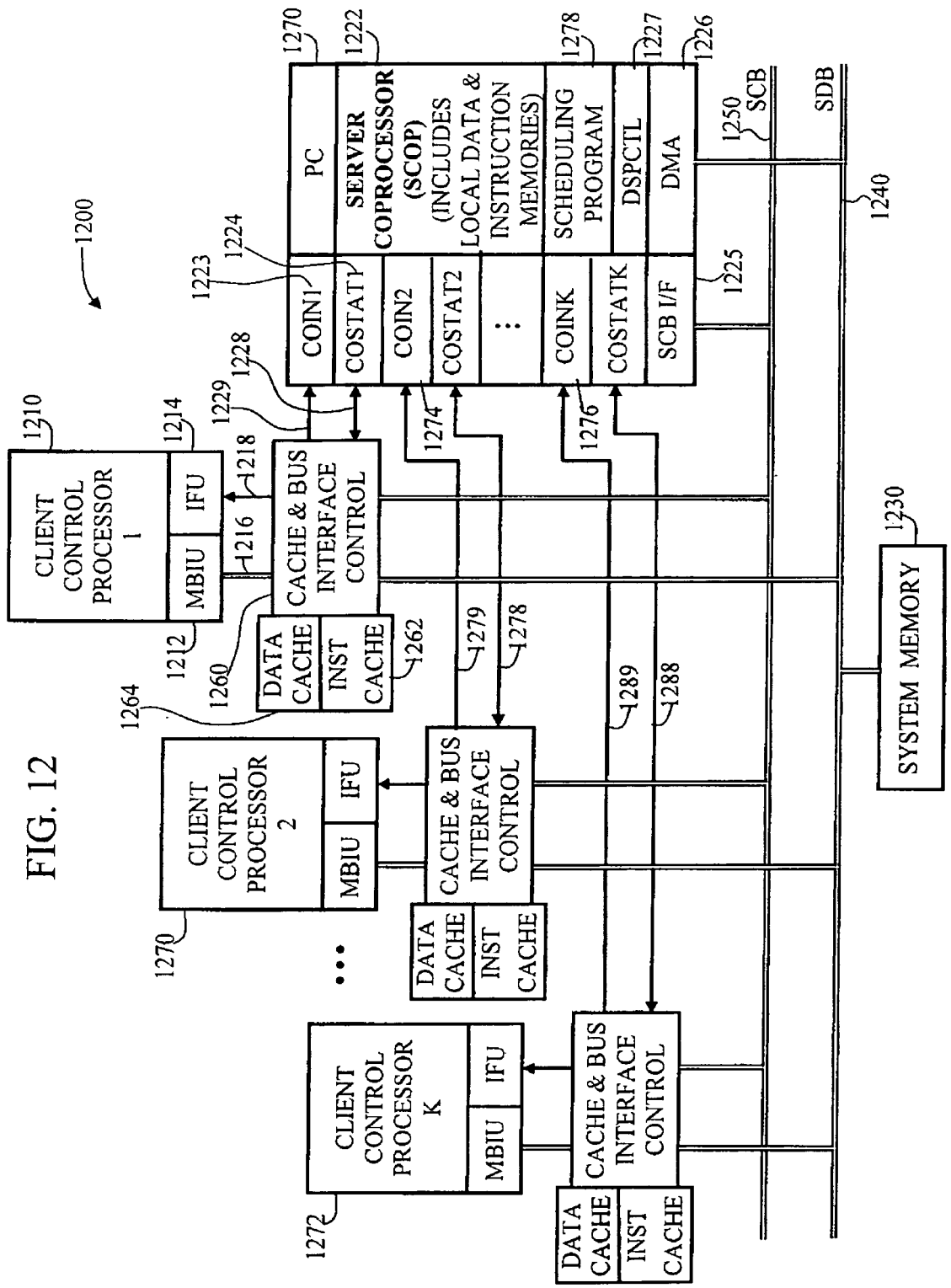
FIG. 12 illustrates a client server coprocessor (CSCOP) system with a server coprocessor (SCOP) supporting multiple client control processors (CCPs) in accordance with the present invention.

FIG. 12 illustrates a client server coprocessor (CSOP) system 1200 with a server coprocessor (SCOP) 1222 supporting multiple client control processors (CCPs) 1210, 1270, and 1272 in accordance with the present invention. In FIG. 12 blocks and signal paths which are similar to blocks and signal paths in FIG. 11 are given numbers with the last two digits being the same. Given the flexibility of the coprocessing interface described in the preceeding sections, it is possible to extend the capability further to allow multiple coprocessing interfaces for a single coprocessor. These interfaces might be either loosely-coupled or firmly-coupled depending on the application. By providing multiple interfaces (COIN registers or FIFO queues 1223, 1274, through 1276), it is possible to construct systems in which a single powerful coprocessor 1222 is able to act as a "server" for multiple "client" HCPs, such as client control processor 1 (CCP1) 1210, CCP2 1270, through CCPK 1272. It is noted, as with the system 1100 of FIG. 11, the COIN register 1223 may also be extended to become a first-in-first (FIFO) queue for instructions. Each "client" has its own coprocessor instruction FIFO interface which is serviced in turn by the coprocessor. This multi-queue-single-server model may be useful for high-performance compute server processing cores which can service multiple control processor clients, such as "client-server-on-a-core" or in other terms a client-server system on chip (SOC or CSOC).

In the discussion which follows, the following terminology is used: the server processor or DSP is called the SCOP 1222. The client control processors are designated CCPs, CCP1 1210, CCP2 1270, through CCPK 1272. In this embodiment of the present invention, a single instruction port on the SCOP 1222 is used for each CCP, which is essentially an instruction FIFO together with special control logic to allow the SCOP 1222 to stall when the FIFO is empty, and in addition allow it to operate in either a tightly coupled (locked PC) mode, or a firmly coupled (branch-capable) mode. For example, CCP1 1210 uses a coprocessor instruction bus 1229 and interface control signals 1228 as an interface path to the SCOP 1222. CCP2 1270 uses a second coprocessor instruction bus 1279 and second interface control signals 1278 as a second interface path to the SCOP 1222. CCPK 1272 uses a third coprocessor instruction bus 1289 and third interface control signals 1288 as a $K^{th}$ interface path to the SCOP 1222. Instruction requests are posted to the queues by the CCPs and the SCOP 1222 processes requests according to a scheduling program 1278 which it executes after each request is serviced (for SCOPs with PCs). This type of operation requires the CCPs to manage the setup of data I/O for the SCOP, and synchronization.

While the present invention is disclosed in the context of a presently preferred embodiment, it will be recognized that a wide variety of implementations may be employed by persons of ordinary skill in the art consistent with the above discussion and the claims which follow below.

I claim:

1. An apparatus for providing a single coprocessor to act as a server (SCOP) to support a number of client control processors (CCP) wherein each client has its own coprocessor instruction port which is serviced in turn by the single coprocessor acting as the server, the apparatus comprising:

a coprocessor acting as a server coprocessor SCOP for a plurality of client control processors (CCPs); and a plurality of instruction ports on the SCOP, each instruction port coupled to a CCP, at least one of the plurality of instruction ports includes an instruction queue to which a coupled CCP posts instructions and instruction control logic to control the SCOP so that the SCOP operates in either a tightly coupled mode, wherein the SCOP receives and executes the posted instructions, or a firmly coupled mode, wherein the SCOP fetches an instruction stream as directed by the posted instructions.

2. The apparatus of claim 1 wherein at least one client control processor sets up a data I/O for the single coprocessor.

3. The apparatus of claim 1 wherein at least one of the plurality of instruction ports is a dynamic debug interface.

4. A system for off loading coprocessor instructions from at least two control processors to a single coprocessor, the system comprising:
   the at least two control processors;
   the single coprocessor having an instruction port for each control processor; and
   at least two coprocessor instruction buses, each coprocessor instruction bus coupled to a control processor and corresponding instruction port, the at least two control processors posting coprocessor instructions to their respective instruction ports, the single coprocessor processing in turn the posted coprocessor instructions for the at least two control processors.

5. The system of claim 4 wherein the single coprocessor further comprises a program counter (PC) and instruction memory, wherein the coprocessor instructions are messages, the single coprocessor executing an instruction sequence stored in instruction memory to interpret the messages.

6. The system of claim 5 wherein a message has a message value, wherein the single coprocessor further operates to execute a sequence of instructions depending on the message value.

7. The system of claim 4 wherein at least one of the instruction ports includes a coprocessor interface register for receiving coprocessor instructions posted by the coupled control processor.

8. The system of claim 4 wherein at least one of the instruction ports includes a first-in first-out (FIFO) queue for receiving coprocessor instructions posted by the coupled control processor.

9. The system of claim 4 wherein each control processor sets up a data I/O for the single coprocessor.

10. The system of claim 4 wherein the coprocessor instructions are operated on in a loosely coupled mode of operation.

11. The system of claim 4 wherein the coprocessor instructions are operated on in a firmly coupled mode of operation.

12. The system of claim 4 wherein at least one instruction port is a dynamic debug interface.

13. A method of off loading coprocessor instructions from at least two client control processors to a single coprocessor comprising:
    coupling at least two control processors to corresponding instruction ports of a single coprocessor;
    posting coprocessor instructions from the at least two control processors to the corresponding instruction ports of the single coprocessor; and
    processing coprocessor instructions from the corresponding instruction ports by the single coprocessor according to a scheduling program.

14. The method of claim 13 wherein the single coprocessor comprises a program counter (PC) and instruction memory, wherein the coprocessor instructions are messages, the method further comprising:
    executing an instruction sequence stored in instruction memory to interpret the messages.

15. The method of claim 14 wherein a message has a message value, the method further comprising:
    executing a sequence of instructions depending on the message value.

16. The method of claim 13 wherein at least one of the instruction ports includes a coprocessor interface register for receiving coprocessor instructions posted by the coupled control processor.

17. The method of claim 13 wherein at least one of the instruction ports includes a first-in first-out (FIFO) queue for receiving coprocessor instructions posted by the coupled control processor.

18. The method of claim 13 wherein at least one control processor sets up a data I/O for the single coprocessor.

19. The method of claim 13 wherein at least one of the corresponding instruction ports is a dynamic debug interface.

* * * * *